United States Patent
Takahashi

(10) Patent No.: US 12,391,587 B2
(45) Date of Patent: Aug. 19, 2025

(54) METHOD FOR PRODUCING WATER CONTAINING PERMANGANATE IONS

(71) Applicant: TOHOKU UNIVERSITY, Sendai (JP)

(72) Inventor: Masayoshi Takahashi, Sendai (JP)

(73) Assignee: TOHOKU UNIVERSITY, Sendai (JP)

(*) Notice: Subject to any disclaimer, the term of this patent is extended or adjusted under 35 U.S.C. 154(b) by 408 days.

(21) Appl. No.: 18/015,704

(22) PCT Filed: Jul. 21, 2021

(86) PCT No.: PCT/JP2021/027308
§ 371 (c)(1),
(2) Date: Jan. 11, 2023

(87) PCT Pub. No.: WO2022/019327
PCT Pub. Date: Jan. 27, 2022

(65) Prior Publication Data
US 2023/0286840 A1    Sep. 14, 2023

(30) Foreign Application Priority Data
Jul. 22, 2020 (JP) ................. 2020-125863

(51) Int. Cl.
*C02F 1/66* (2023.01)
*C01G 45/12* (2025.01)
*C02F 1/68* (2023.01)
*C02F 1/78* (2023.01)

(52) U.S. Cl.
CPC ............ *C02F 1/68* (2013.01); *C01G 45/12* (2013.01); *C02F 1/66* (2013.01); *C02F 1/78* (2013.01)

(58) Field of Classification Search
CPC ............ C02F 1/68; C02F 1/78; C01G 45/12
See application file for complete search history.

(56) References Cited

U.S. PATENT DOCUMENTS

2023/0286840 A1* 9/2023 Takahashi ............... C02F 1/66

FOREIGN PATENT DOCUMENTS

| CN | 106745956 A | 5/2017 |
| CN | 107540021 A | 1/2018 |
| WO | 2016/017820 A1 | 2/2016 |

OTHER PUBLICATIONS

Lu et al—CN 107540021 A FIT translation—2018 (Year: 2018)*
International Search Report for International Application No. PCT/JP2021/027308 dated Sep. 21, 2021 (2 sheets).
Nanotech Japan Bulletin; vol. 2; No. 1; 2009; http://www.nanonet.go.jp/magazine/archive/?page=1151.html (8 sheets).

* cited by examiner

*Primary Examiner* — Bradley R Spies
(74) *Attorney, Agent, or Firm* — Kratz, Quintos & Hanson, LLP

(57) ABSTRACT

An object of the present invention is to provide a novel method for producing, without using an organic iron compound as a production raw material, water in which permanganate ions exist stably over a long period of time. As a means for resolution, the method comprises dissolving a divalent inorganic iron compound and a divalent manganese compound in water with a pH of less than 3.5, and then feeding ozone microbubbles into the water.

7 Claims, No Drawings

METHOD FOR PRODUCING WATER CONTAINING PERMANGANATE IONS

TECHNICAL FIELD

The present invention relates to a method for producing water containing permanganate ions.

BACKGROUND ART

As is well known, permanganate ions ($MnO_4$:VII) have been used as an oxidizing agent in various oxidation reactions. In addition, the uses of permanganate ions as a bactericide and a deodorant are also known. However, in the case where permanganate ions are prepared by dissolving a permanganate compound such as potassium permanganate in water, there is a problem in that the permanganate ions are reduced and disappear within a short period of time. In order to solve this problem, the present inventor has worked on research on a method for producing water in which permanganate ions exist stably over a long period of time. As a result, in Patent Document 1, the present inventor has reported a method for producing water containing permanganate ions, comprising dissolving a 0.1 µM to 1 mM divalent manganese compound, a 0.1 µM to 1 mM organic iron compound, and a 1 to 300 mM inorganic salt in water that has ozone microbubbles generated using an ozone gas having a concentration of 1 to 300 g/Nm³.

PRIOR ART DOCUMENTS

Patent Document

Patent Document 1: WO2016/017820

SUMMARY OF THE INVENTION

Problems that the Invention is to Solve

The method for producing water containing permanganate ions reported by the present inventor in Patent Document 1 allows permanganate ions to exist stably in water over a long period of time, and thus is highly appreciated by those skilled in the art. However, as described in Patent Document 1, when water containing permanganate ions is produced by this method, a precipitate is formed in the water. It has later been found out that the amount of precipitate formed is large, and it takes several days for the precipitate formation to subside, causing an inconvenience in that it takes time to filter the formed precipitate before shipment as a product. With respect to why such precipitate formation, which continues for several days, occurs, the cause has been speculated to be use of an organic iron compound as a production raw material.

Thus, an object of the present invention is to provide a novel method for producing, without using an organic iron compound as a production raw material, water in which permanganate ions exist stably over a long period of time.

Means for Solving the Problems

The method for producing water containing permanganate ions of the present invention accomplished in view of the above points comprises, as defined in claim 1, dissolving a divalent inorganic iron compound and a divalent manganese compound in water with a pH of less than 3.5, and then feeding ozone microbubbles into the water.

In addition, the method according to claim 2 is the method according to claim 1, wherein the divalent inorganic iron compound is at least one member selected from iron(II) chloride, iron(II) sulfate, and iron(II) nitrate.

In addition, the method according to claim 3 is the method according to claim 1, wherein the divalent inorganic iron compound is dissolved to a divalent iron ion concentration of 1 to 100 ppb.

In addition, the method according to claim 4 is the method according to claim 1, wherein the divalent manganese compound is at least one member selected from manganese(II) chloride, manganese(II) sulfate, and manganese(II) nitrate.

In addition, the method according to claim 5 is the method according to claim 1, wherein the divalent manganese compound is dissolved to a divalent manganese ion concentration of 0.1 µM to 1 mM.

In addition, the method according to claim 6 is the method according to claim 1, wherein no inorganic salt is further dissolved.

In addition, the method according to claim 7 is the method according to claim 1, wherein after feeding ozone microbubbles into the water, the pH is adjusted to 5.0 to 9.0.

Effect of the Invention

According to the present invention, a novel method for producing, without using an organic iron compound as a production raw material, water in which permanganate ions exist stably over a long period of time can be provided.

MODE FOR CARRYING OUT THE INVENTION

The method for producing water containing permanganate ions of the present invention comprises dissolving a divalent inorganic iron compound and a divalent manganese compound in water with a pH of less than 3.5, and then feeding ozone microbubbles into the water.

In the method for producing water containing permanganate ions of the present invention, first, a divalent inorganic iron compound and a divalent manganese compound are dissolved in water with a pH of less than 3.5. The reason why the pH of the water in which a divalent inorganic iron compound and a divalent manganese compound are dissolved is specified to be less than 3.5 is that when a divalent inorganic iron compound is dissolved in water with a pH of 3.5 or more, upon later feeding ozone microbubbles into the water, trivalent iron oxide ($F_2O_3$) may be formed from divalent iron ions and precipitate, making it impossible to sufficiently form permanganate ions. In addition, another reason is that when a divalent manganese compound is dissolved in water with a pH of 3.5 or more, upon later feeding ozone microbubbles into the water, trivalent manganese oxide ($Mn_2O_3$) or tetravalent manganese oxide (manganese dioxide: $MnO_2$) may be formed from divalent manganese ions and precipitate, making it impossible to sufficiently form permanganate ions. The pH of the water in which a divalent inorganic iron compound and a divalent manganese compound are dissolved is preferably less than 3.0.

The water may be, for example, water having an electrical conductivity of less than 300 µS/cm. Pure water having an electrical conductivity of 3 µS/cm or less is suitable, but tap water or groundwater may also be used.

As an acid for adjusting the pH of the water to less than 3.5, it is preferable to use an inorganic acid such as hydrochloric acid, sulfuric acid, or sulfuric acid.

As the divalent inorganic iron compound to be dissolved in water with a pH of less than 3.5, iron(II) chloride, iron(II) sulfate, iron(II) nitrate, and the like can be used. It is preferable that the divalent inorganic iron compound is dissolved to a divalent iron ion concentration of 1 and 100 ppb. When the divalent iron ion concentration is less than 1 ppb, it may not be possible to sufficiently form permanganate ions. Meanwhile, when the divalent iron ion concentration is more than 100 ppb, upon later feeding ozone microbubbles into the water, it is likely that trivalent iron oxide ($Fe_2O_3$) is formed from divalent iron ions and precipitates.

As the divalent manganese compound to be dissolved in water with a pH of less than 3.5, manganese(II) chloride, manganese(II) sulfate, manganese(II) nitrate, and the like can be used. It is preferable that the divalent manganese compound is dissolved to a divalent manganese ion concentration of 0.1 μM to 1 mM. When the divalent manganese ion concentration is less than 0.1 μM, it may not be possible to sufficiently form permanganate ions. Meanwhile, when the divalent manganese ion concentration is more than 1 mM, upon later feeding ozone microbubbles into the water, it is likely that trivalent manganese oxide ($Mn_2O_3$) or tetravalent manganese oxide (manganese dioxide: $MnO_2$) is formed from divalent manganese ions and precipitates. It is more preferable that the divalent manganese compound is dissolved to a divalent manganese ion concentration of 1 to 100 μM.

The order of dissolving the divalent inorganic iron compound and the divalent manganese compound in water with a pH of less than 3.5 is not particularly limited. They may be dissolved simultaneously or may also be dissolved stepwise.

Incidentally, in the method for producing water containing permanganate ions of the present invention, unlike the method for producing water containing permanganate ions described in Patent Document 1, no further dissolution of an inorganic salt such as sodium chloride, potassium chloride, magnesium chloride, or magnesium sulfate is required. Although further dissolution of an inorganic salt does not adversely affect the production of water containing permanganate ions by the method of the present invention, it may limit the uses of the water containing permanganate ions produced (application of high-salinity water to electrical equipment, for example, is undesirable). Therefore, it is preferable that no inorganic salt is further dissolved.

Next, into the water with a pH of less than 3.5 having dissolved therein the divalent inorganic iron compound and the divalent manganese compound, ozone microbubbles are fed for a predetermined period of time, for example, 1 minute to 24 hours. The method for feeding ozone microbubbles into the water may be a method known per se, and may be performed using a two-phase flow swirl-type or pressurized dissolution-type microbubble generator capable of generating microbubbles having a particle size of 5 to 50 μm. In the case where a two-phase flow swirl type is employed, a vortex flow having a radius of 10 cm or less is forcibly generated using a rotor or the like, and a gas-liquid mixture containing ozone to be contained in microbubbles is hit against an obstacle such as a wall surface or a fluid with a different relative velocity, whereby the gas component acquired in the vortex flow is dispersed with the disappearance of the vortex, and desired ozone microbubbles can thus be generated. In addition, in the case where a pressurized dissolution type is employed, ozone to be contained in microbubbles is dissolved in water at a high pressure of 2 atm or more and then released to atmospheric pressure, and, from the resulting dissolved gas supersaturation conditions, ozone microbubbles can be generated. In this case, at the pressure release site, a large number of vortices having a radius of 1 mm or less are generated using the water flow and an obstacle, and a large amount of gas-phase nuclei (bubble nuclei) are formed due to the oscillation of water molecules in the central region of the vortex flow. At the same time, with the supersaturation conditions, the gas component in water is diffused toward these bubble nuclei, causing the bubble nuclei to grow, whereby desired ozone microbubbles can be generated in a large amount. Incidentally, ozone microbubbles generated by these methods have a particle size of 50 μm or less. The particle size has a peak at 10 to 15 μm as measured with a laser-blocking liquid particle counter (e.g., LiQuilaz-E20 manufactured by SPM Co., etc.). The number of microbubbles in the peak region is 1000/mL or more (see JP2000-51107A, JP2003-265938A, etc., if necessary). As the ozone gas used for feeding ozone microbubbles into the water, for example, an ozone gas prepared to a concentration of 1 to 300 $g/Nm^3$ using a commercially available oxygen source ozone generator can be mentioned. In the case where an ozone gas having a concentration of less than 1 $g/Nm^3$ is used, it may not be possible to efficiently feed a large amount of ozone microbubbles into the water. Meanwhile, an ozone gas having a concentration of more than 300 $g/Nm^3$ is difficult to prepare. Incidentally, the ozone gas may contain oxygen, nitrogen, and the like in addition to ozone.

Water in which permanganate ions exist stably over a long period of time can be produced through the above steps, and the pH of the water containing permanganate ions produced is less than 3.5. Therefore, in order to make the water containing permanganate ions produced weakly acidic to weakly alkaline, which is highly versatile for the uses of permanganate ions, such as an oxidizing agent, a bactericide, and a deodorant, it is preferable that the pH is adjusted to 5.0 to 9.0 after feeding ozone microbubbles into the water for a predetermined period of time. As an alkali for adjusting the pH of the water to 5.0 to 9.0, it is preferable to use an inorganic alkali such as sodium hydroxide or potassium hydroxide.

The water containing permanganate ions thus produced has a pH of 5.0 to 9.0 and is highly versatile for the uses of permanganate ions. Just like the water containing permanganate ions produced by the method described in Patent Document 1, permanganate ions exist stably in the water at a concentration of 0.1 μM to 1 mM, typically 1 to 100 μM, over a long period of time, and their half-life is, for example, 3 months or more when filled in an airtight container at atmospheric pressure and stored under a temperature condition of 40° C. The salinity is preferably 0.3% or less, and more preferably 0.1% or less. In addition, when the pH of the water containing permanganate ions is adjusted to 5.0 to 9.0, a precipitate is formed in the water, but the amount of precipitate formed is small, and the formation subsides within a short period of time. Therefore, after the pH of the water containing permanganate ions is adjusted to 5.0 to 9.0, for example, on the following day, the formed precipitate can be filtered, and shipment as a product can be done.

EXAMPLES

Hereinafter, the present invention will be described in detail with reference to the examples. However, the present invention should not be construed as being limited to the following descriptions.

Example 1

10 L of ultrapure water having an electrical conductivity of 0.06 μS/cm was placed in a glass container having a volume of 15 L, and hydrochloric acid was added thereto to adjust the pH to 2.8. Subsequently, iron(II) chloride was dissolved to a divalent iron ion concentration of about 25 ppb, and, at the same time, manganese(II) chloride was dissolved to a divalent manganese ion concentration of 50 μM. Into this liquid, ozone microbubbles having a particle size of 15 to 50 μm were generated using a pressurized dissolution-type microbubble generator and fed for 10 minutes. The generator was driven while circulating the water inside. To the microbubble generator, an ozone gas prepared at a concentration of about 50 g/Nm$^3$ using an oxygen source ozone generator was fed at about 1 L/min. After 10 minutes, the water turned pale pink, suggesting the formation of permanganate ions in the water. After the driving of the microbubble generator was stopped, sodium hydroxide was added to adjust the pH to 7.0. The water was left naturally a whole day and night in an indoor environment, and a small amount of precipitate formed in the water during the adjustment of the pH to 7.0 was filtered off through a 1.2 μm membrane filter (no further formation of precipitate was noted thereafter). The obtained filtrate was measured with a UV-Vis-NIR spectrophotometer. As a result, a peak group of permanganate ions was present near 500 to 600 nm (with respect to water containing permanganate ions produced by dissolving sodium chloride in distilled water to a salinity of 0.25% and then dissolving potassium permanganate therein, measurement was performed under the same conditions to confirm the presence of a peak group of the same shape at the same location).

The water containing permanganate ions thus produced had a permanganate ion concentration of about 10 μM (the concentration calculated by comparing the height of the peak group of permanganate ions measured with a UV-Vis-NIR spectrophotometer with the height of the peak group of, as a reference solution, water containing permanganate ions at a concentration of 20 μM prepared using potassium permanganate). The salinity was measured with a salinity meter and found to be about 0.05%. This water containing permanganate ions was filled in a PET bottle as an airtight container at atmospheric pressure and stored under a temperature condition of 40° C., and the half-life of permanganate ions in this case was examined and found to be 3 months or more (half or more of permanganate ions remained at the three-month passing time point). In addition, 1 mL of this water containing permanganate ions was sampled, and ethylenediaminetetraacetic acid (EDTA) was added thereto to a concentration of 20 mM. Subsequently, 5,5-dimethyl-1-pyrroline N-oxide (DMPO) was added to a concentration of 200 mM, and then hydrochloric acid was further added to a concentration of 500 mM. The obtained mixture was sucked into a quartz cell and measured with an electron spin resonance apparatus (ESR). As a result, a prominent DMPO-OH signal with a peak pattern of 1:2:2:1 was confirmed. In addition, this water containing permanganate ions was placed in a PET bottle and stored in a cool and dark place, and the same measurement was performed after 3 months. As a result, a signal with a peak pattern of 1:2:2:1 was confirmed, and the peak length was 90% or more of the peak length immediately after production.

Example 2

Water containing permanganate ions was produced in the same manner as in Example 1, except that instead of the operation of adjusting the pH of the water to 7.0 by adding sodium hydroxide in Example 1, the amount of sodium hydroxide added was reduced to adjust the pH to 5.5. The water containing permanganate ions thus produced had a permanganate ion concentration of about 10 μM and a salinity of about 0.03%. The half-life of permanganate ions in this water containing permanganate ions and the results of measurement with an electron spin resonance apparatus were the same as in the case of the water containing permanganate ions produced in Example 1.

Example 3

Water containing permanganate ions was produced in the same manner as in Example 1, except that iron(II) sulfate was added instead of iron(II) chloride. The water containing permanganate ions thus produced had a permanganate ion concentration of about 10 μM and a salinity of about 0.05%. The half-life of permanganate ions in this water containing permanganate ions and the results of measurement with an electron spin resonance apparatus were the same as in the case of the water containing permanganate ions produced in Example 1.

Example 4

Water containing permanganate ions was produced in the same manner as in Example 1, except that manganese (II) sulfate was added instead of manganese(II) chloride. The water containing permanganate ions thus produced had a permanganate ion concentration of about 10 μM: and a salinity of about 0.05%. The half-life of permanganate ions in this water containing permanganate ions and the results of measurement with an electron spin resonance apparatus were the same as in the case of the water containing permanganate ions produced in Example 1.

Example 5

The water containing permanganate ions produced in Example 1 was examined for bactericidal effects on *Salmonella enteritidis*, a pathogen. As a result, excellent bactericidal effects were observed.

Example 6

The water containing permanganate ions produced in Example 1 was orally administered to day-old chicks hatched from SPF eggs of Line-M chickens to examine toxicity. As a result, no toxicity was observed.

Example 7

The water containing permanganate ions produced in Example 1 was examined for cytotoxicity against chick embryo fibroblasts (CEF cells). As a result, no cytotoxicity was observed.

INDUSTRIAL APPLICABILITY

According to the present invention, a novel method for producing, without using an organic iron compound as a production raw material, water in which permanganate ions exist stably over a long period of time can be provided. In this respect, the present invention is industrially applicable.

The invention claimed is:

1. A method for producing water containing permanganate ions, comprising dissolving a divalent inorganic iron compound and a divalent manganese compound in water with a pH of less than 3.5, and then feeding ozone microbubbles into the water.

2. The method according to claim 1, wherein the divalent inorganic iron compound is at least one member selected from iron(II) chloride, iron(II) sulfate, and iron(II) nitrate.

3. The method according to claim 1, wherein the divalent inorganic iron compound is dissolved to a divalent iron ion concentration of 1 to 100 ppb.

4. The method according to claim 1, wherein the divalent manganese compound is at least one member selected from manganese(II) chloride, manganese(II) sulfate, and manganese(II) nitrate.

5. The method according to claim 1, wherein the divalent manganese compound is dissolved to a divalent manganese ion concentration of 0.1 μM to 1 mM.

6. The method according to claim 1, wherein no inorganic salt is further dissolved.

7. The method according to claim 1, wherein after feeding ozone microbubbles into the water, the pH is adjusted to 5.0 to 9.0.

* * * * *